Feb. 14, 1956   H. B. VAN RADEN   2,734,755
TANDEM AXLE SPRING AND TORQUE ARM ASSEMBLY
Filed Feb. 13, 1953   5 Sheets-Sheet 4
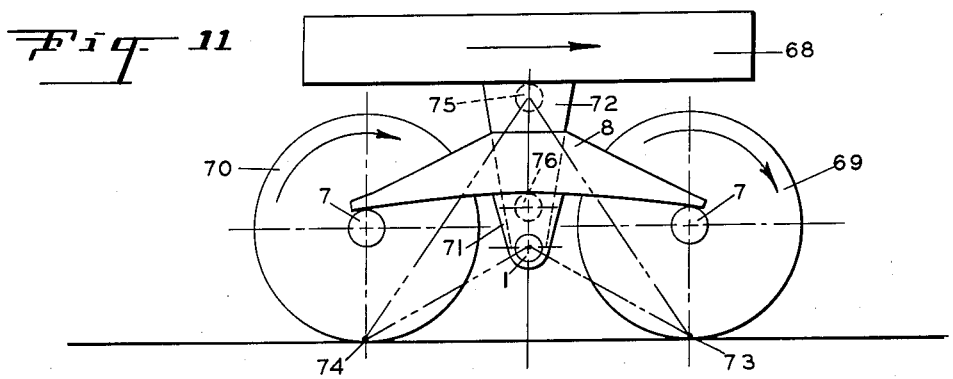
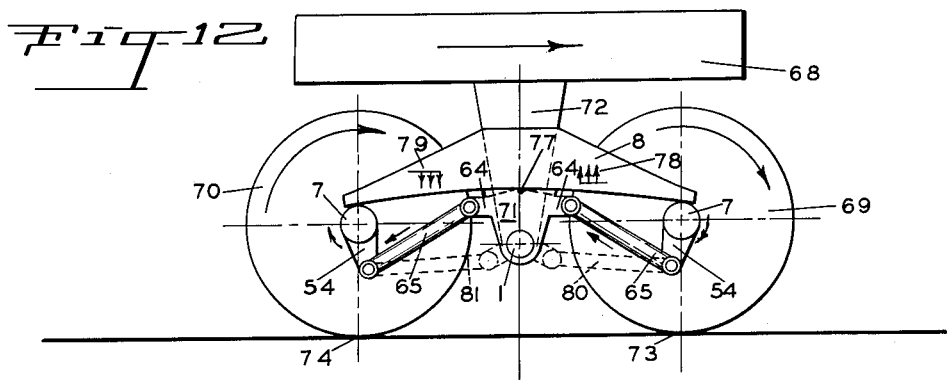
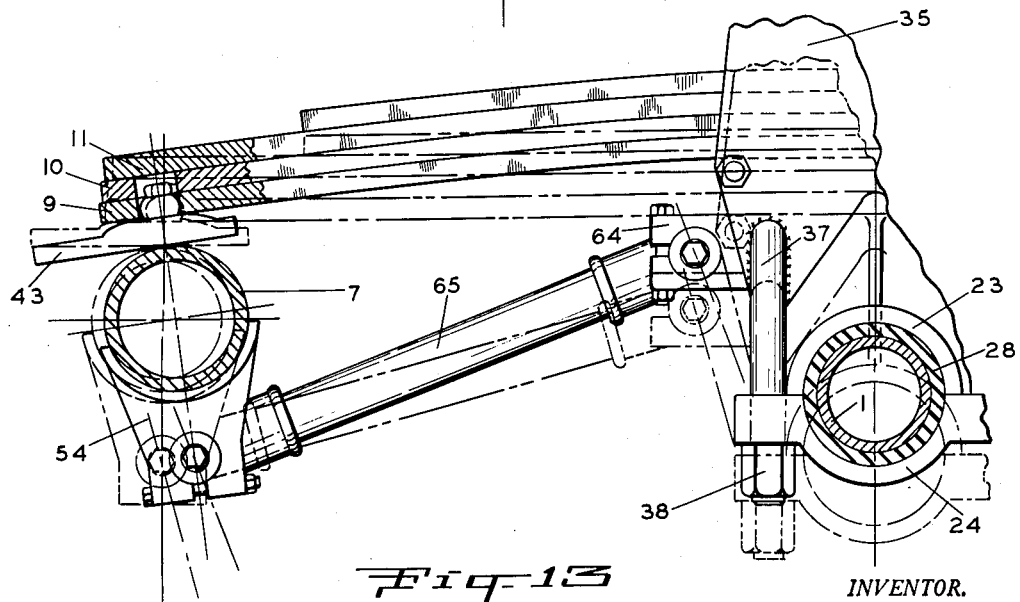
INVENTOR.
HARVEY B. VAN RADEN
BY
Buckhorn and Cheatham
ATTORNEY Feb. 14, 1956  H. B. VAN RADEN  2,734,755
TANDEM AXLE SPRING AND TORQUE ARM ASSEMBLY
Filed Feb. 13, 1953  5 Sheets-Sheet 5

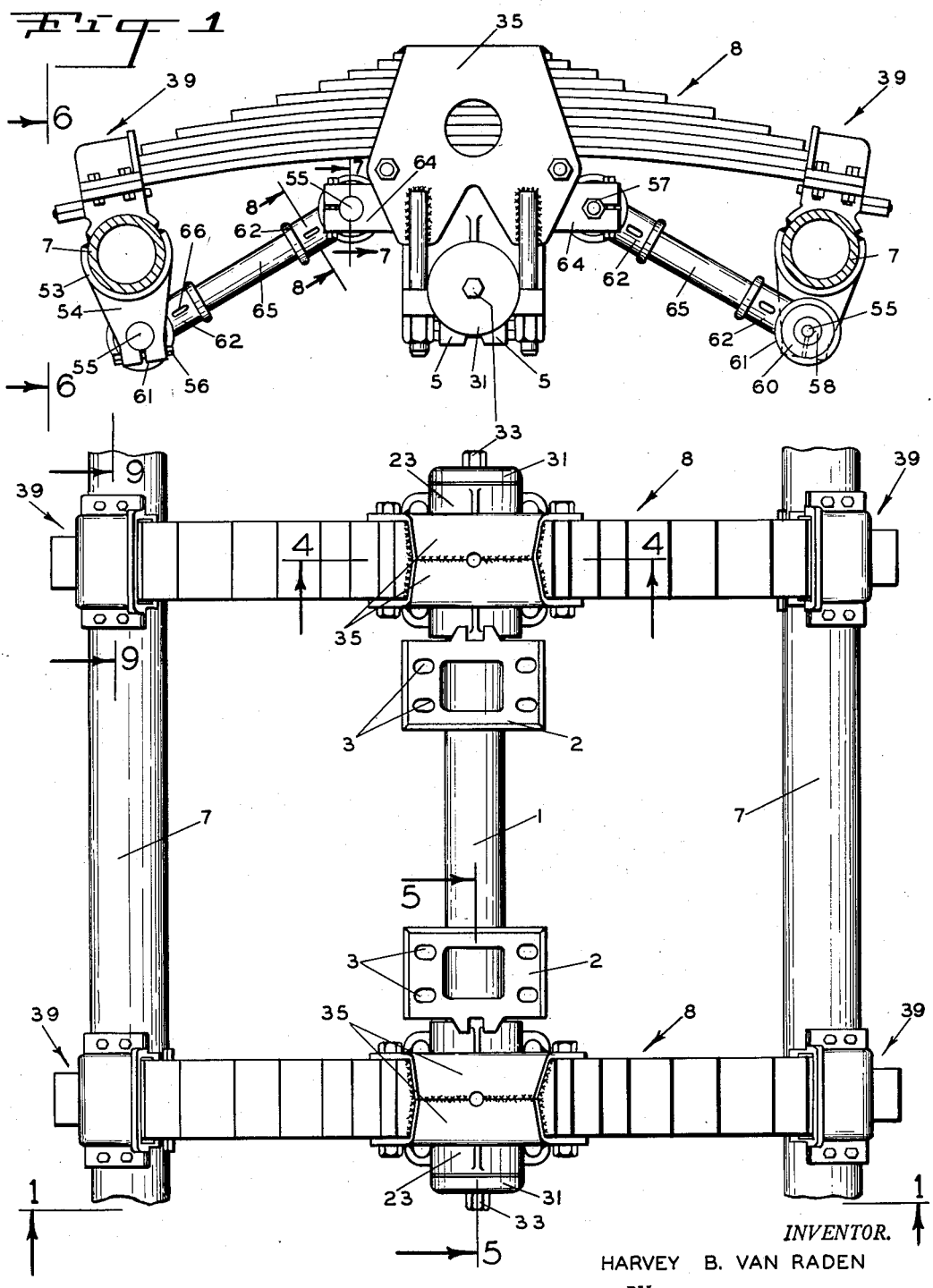

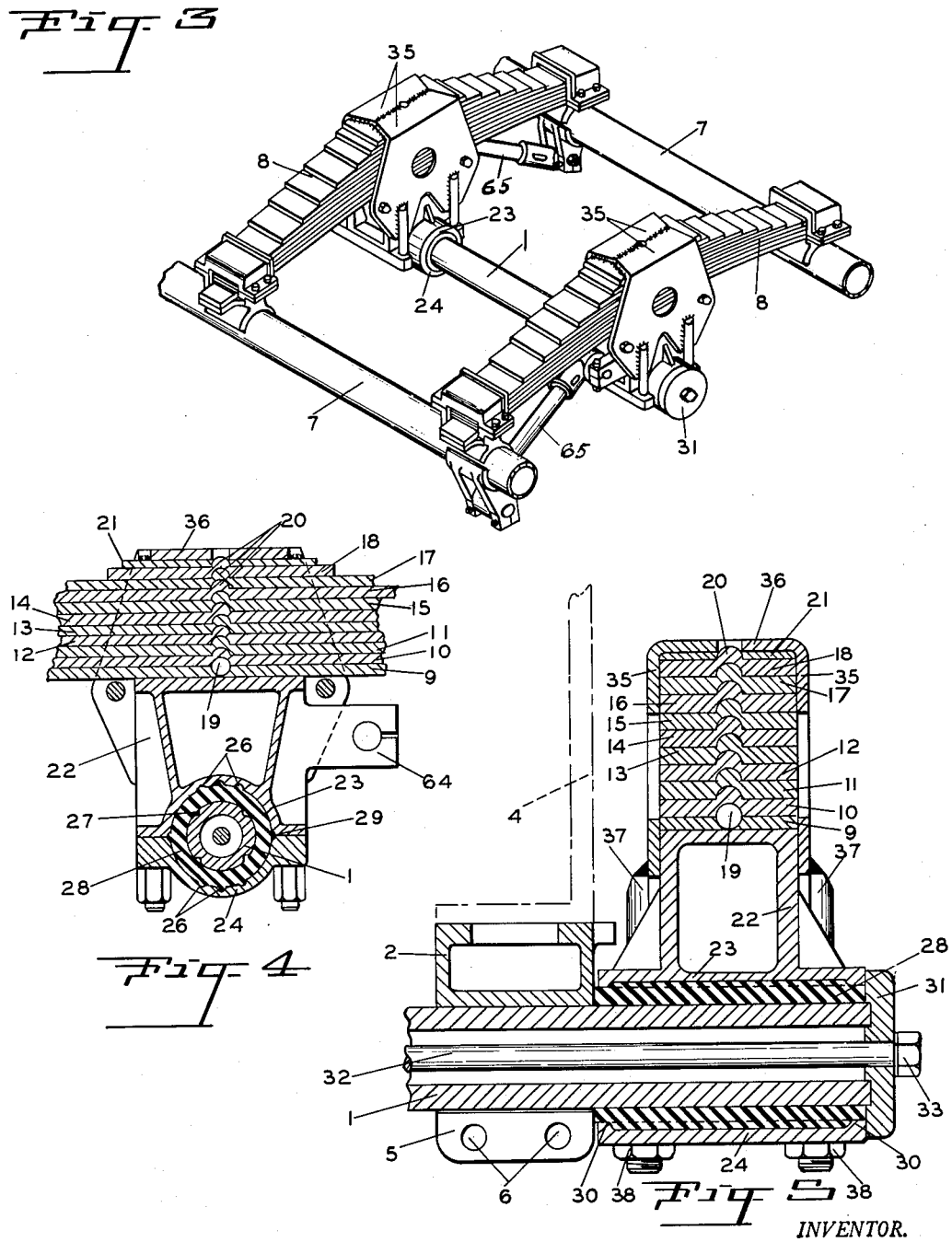

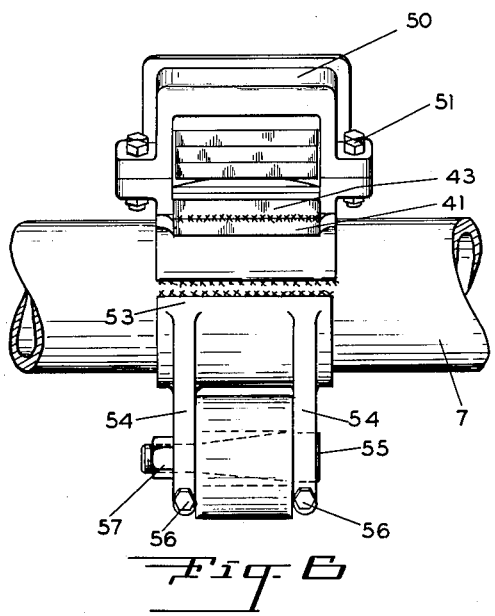
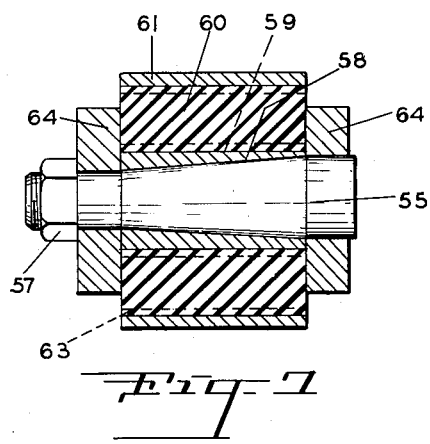
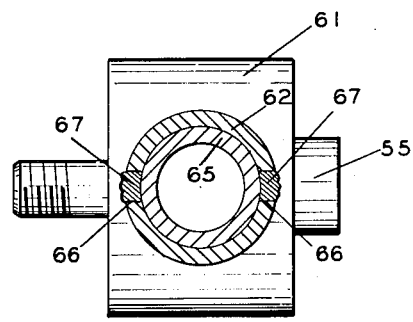
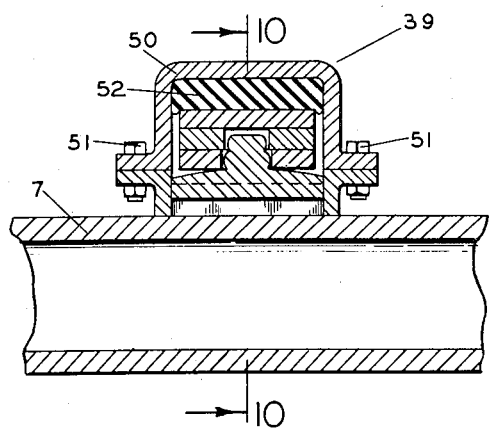
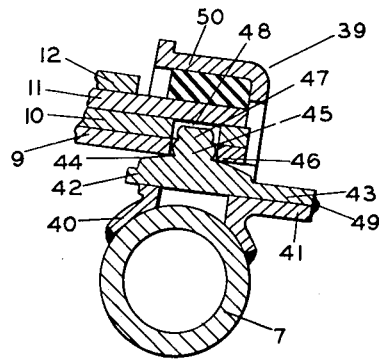

INVENTOR.
HARVEY B. VAN RADEN
BY
Buckhorn and Cheatham
ATTORNEY

United States Patent Office 2,734,755
Patented Feb. 14, 1956

2,734,755

TANDEM AXLE SPRING AND TORQUE ARM ASSEMBLY

Harvey B. Van Raden, Portland, Oreg., assignor to Ne Peer Company, Portland, Oreg., a copartnership Application February 13, 1953, Serial No. 336,778

4 Claims. (Cl. 280—104.5)

My present invention comprises an improvement in vehicles, particularly trailer vehicles designed for heavy loads, such as logging trailers, tank trailers, and trailer vans. The present invention comprises an improved tandem axle suspension resulting in longer life of the mechanical equipment and tires, greater safety and smoother riding characteristics.

The present invention comprises an improvement in the trunnion type of tandem axle suspension. Every suspension of this type has a tendency when brakes are applied to transfer some of the load from the rear axle to the front axle, with the result that the rear wheels lose some of their traction and may slide. This action results in excessive tire scuffing and quite often, particularly in hilly country, the tires are quickly worn all the way through the rubber and fabric with resulting dangerous blowouts. On steep grades of temporary roads such as used by logging trailers the resulting lack of traction may result in fatal wrecks. A number of constructions have heretofore been provided in an attempt to overcome this characteristic. The most common of these constructions are as follows: Larger and more powerful front brakes are employed, or the rear brakes are applied with less force than the front brakes, or the rear brakes are provided with brake linings of less efficiency than the linings of the front brakes, or the load is offset to cause the rear axle to carry more than one-half of the total load when on level ground. If the first three alternatives are employed, the front brakes must do more than one-half of the total work in bringing the trailer to a stop, with the result that the front brakes are overworked and their brake linings wear out faster than the rear brake linings, quite often being worked beyond the capacity of the brake drums to dissipate the heat, with resulting heat cracks and destruction of the brake linings. If the latter alternative is employed the rear axle normally carries more than one-half of the total load, a condition which is not tolerated under many state highway laws since many times the load may equal the total capacity of both axles and the four tires if they are equally loaded. The present invention has for its principal object the provision of means to overcome all of the deficiencies noted above, permitting the use of brakes of equal size, efficiency, and effect and equally loaded axles and tires, while applying the braking effect to force the rear wheels firmly into contact with the ground.

A further object of the present invention is to provide means of the character described in which the leaf springs employed in a tandem axle suspension are firmly connected to the axles while permitting relative play between the axles and the springs, and between the axles and the trunnion, whereby the vehicle will perform efficiently on uneven terrain, the construction eliminating any tendency that a tandem axle suspension may have to tear itself to pieces in order to carry out the previously cited object. The present invention comprises a pair of torque links and universal pivot connections between the ends of the leaf springs and the axles, in which any tendency for the torque links to fight with the connections of the leaf springs to the axles is eliminated.

The objects and advantages of the present invention may be more readily understood by reference to the accompanying drawings taken in connection with the following specification wherein like numerals refer to like parts throughout, and in which a preferred form of the present invention is illustrated and described.

In the drawings,

Fig. 1 is a view in side elevation of the present invention, with the wheel mounting axles broken away substantially along line 1—1 of Fig. 2;

Fig. 2 is a plan view of Fig. 1;

Fig. 3 is a view in perspective, on a reduced scale, of the suspension;

Fig. 4 is a vertical section taken substantially along line 4—4 of Fig. 2;

Fig. 5 is a vertical section taken substantially along line 5—5 of Fig. 2;

Fig. 6 is an end view of a portion of the assembly taken substantially from the plane of the line 6—6 of Fig. 1;

Fig. 7 is a vertical section taken substantially along line 7—7 of Fig. 1;

Fig. 8 is a section taken substantially along line 8—8 of Fig. 1;

Fig. 9 is a section taken substantially along line 9—9 of Fig. 2;

Fig. 10 is a vertical section taken substantially along line 10—10 of Fig. 9;

Fig. 11 is a schematic side elevation of a vehicle embodying the present invention and illustrating certain of the principles involved;

Fig. 12 is a view similar to Fig. 11;

Fig. 13 is a partial side elevation, with parts broken away, illustrating the action of the present invention.

Figure 14:
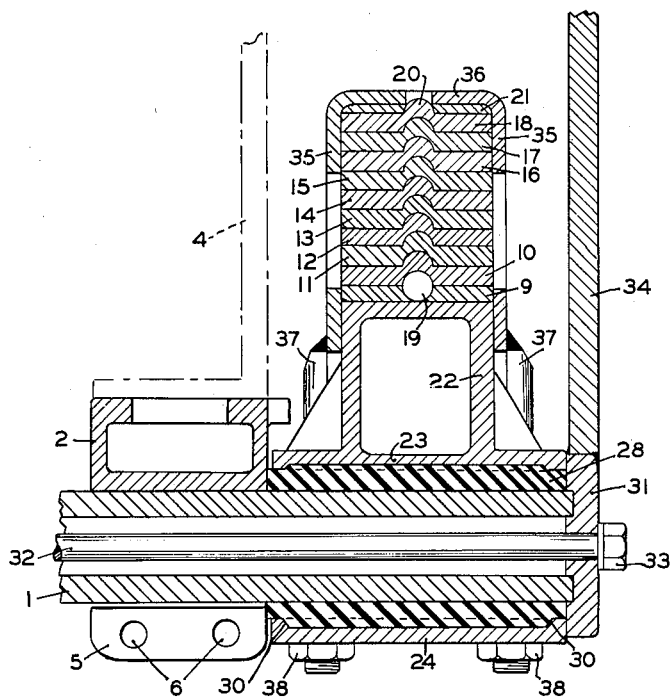
Fig. 14 is a view similar to Fig. 5 and showing a modification of the structure.

The present invention comprises an elongated trunnion 1 which is mounted upon and extends transversely beneath a vehicle such as a trailer. A convenient form of mounting comprises a pair of mounting blocks 2 provided with convenient openings 3 for reception of rivets, studs or bolts whereby the mounting blocks may be attached to the lower flanges of the main longitudinal frame members indicated at 4 in Fig. 5. The lower portions of the mounting blocks comprise split collars having flanges 5 provided with openings 6 for reception of clamping bolts (not shown).

A longitudinally spaced pair of laterally extending, elongated wheel mounting members 7, at the opposite ends of which the four wheels are mounted in any convenient fashion, are maintained equidistantly before and after the trunnion 1. The wheel mounting members are maintained parallel to and in spaced relation to the trunnion by means including a pair of laterally spaced, longitudinally extending leaf springs 8, the central portions of which are mounted upon the trunnion by saddle means to be described, and the ends of which overlie the respective wheel mounting members and are connected thereto through universal pivot means to be described. A suitable form of leaf spring is illustrated, comprising three lower leaves 9, 10 and 11 of substantially equal length and progressively shorter leaves 12 to 18, inclusive. The lowermost leaf 9 is provided with a centrally located depression in which is positioned a hardened steel ball 19, half of which projects above the leaf into a downwardly facing depression in the leaf 10 provided by displacing a portion of the leaf material upwardly to provide a projection 20 which is received in a similar depression in the next succeeding leaf, each of the succeeding leaves being similarly shaped so that all of the leaves are maintained together at their central points. The uppermost projection 20 is received in a central opening in a short cap plate 21 which may be welded to a portion of the mounting saddle construction in order to maintain the leaf springs in position in the saddle construction.

The saddle construction comprises a pedestal portion 22 terminating in a flat upper surface as wide as the spring leaves, and extending longitudinally on either side of the center of the leaf spring whereby the central portion of each leaf spring is supported upon a flat surface. The lower portion of the member 22 comprises the upper half of a split housing 23, the lower, longitudinally extending edges of which lie in a horizontal plane and at either side of the trunnion. The flanges of the portions 23 are engaged by the upper surfaces of horizontal flanges on a lower split housing portion 24, the two portions 23 and 24 complementing each other to provide a substantially cylindrical housing surrounding the trunnion 1 in spaced relation thereto, the housing extending outwardly from adjacent the outer surface of the member 2 to a point adjacent the outer end of the trunnion 1. The inner surfaces of the housing portions 23 and 24 are provided with longitudinally extending grooves indicated at 25 and 26, respectively, and the external surface of the trunnion 1 surrounded thereby is provided with a plurality of longitudinally extending grooves indicated at 27 for reception of portions of a resilient sleeve 28 of slightly greater radial thickness than the radial width of the space between the housing and the trunnion. The inner edges of the portions 23 and 24 are chamfered as indicated at 29 in order that material of the sleeve will not be caught between the housing parts when they are drawn together. Each end of the housing parts 23 and 24 is provided with an internal annular flange indicated at 30 to prevent longitudinal movement of the sleeve. The sleeve is longitudinally confined between the outer surface of the member 2 and a trunnion cap 31 is provided with an inwardly facing, annular groove adapted to receive the end of the tubular trunnion 1, and the caps 31 are maintained in position by means of a retainer rod 32 passing through the interior of the trunnion and held in position by nuts 33. If desired a vertical strut 34 may be welded to the upper surface of the cap 31 and to a portion of the vehicle frame to reinforce the construction, as shown in Fig. 14.

The housing parts 23 and 24 are drawn together by a strap preferably comprising a pair of side plates 35 having their upper end portions bent horizontally toward each other and welded together along their meeting edges to provide a top portion 36. As indicated in Figs. 2 to 4, inclusive, the end edges of the top 36 are welded to the plate 21 firmly to fix the strap with respect to the leaf spring. Each of the side plates 35 is welded to a pair of downwardly projecting studs 37 which pass through suitable openings in the flanges of the portions 23 and 24 and have their lower ends threaded for reception of nuts 38 whereby the clamping strap is drawn down against the top of the leaf spring and the two portions of the sleeve housing are clamped together to compress the resilient sleeve 28. By reason of this construction the springs are resiliently supported upon the outer ends of the trunnion for limited rotation, rotation thereof being resisted by the sleeve 28. This construction permits the wheels to accommodate themselves to uneven terrain. The construction as so far described is illustrated, described and claimed in greater detail in my Patent No. 2,481,891, issued September 13, 1949.

Each spring end overlies the respectively located wheel mounting member 7 and is attached thereto by universal joint means indicated at 39. Each of the universal joint means comprises a mounting bracket 40 having its lower surface shaped to conform to the upper surface of the wheel mounting member 7 and its upper surface defining a longitudinally extending groove, the bottom of which is in a substantially horizontal plane and defined in part by the upper surface of an outwardly extending flange 41 of substantial length. A member 42 is at first loosely mounted in the groove in the bracket 40, the member comprising an outwardly extending flange 43 overlying the flange 41. The upper surface of the member 42 is provided with an upwardly convex surface 44, at the center of which there is an integral, upwardly extending, spherically shaped pivot pin 45 which is snugly received in an opening 46 through the lower spring leaf 9. The axis of the opening 46 is normal to the plane of the spring leaf 9 and its diameter is substantially equal to the horizontal diameter of the pivot pin 45 so that the member 42 is accurately located longitudinally with respect to the leaf spring center. A spherically surfaced extension 47 of lesser diameter than the portion 45 extends upwardly into an elongated slot 48 in the second spring leaf 10. When the trunnion 1 has been attached to the vehicle body in exactly transverse relation to the longitudinal axis thereof, the wheel mounting members 7 may be brought into exact parallelism therewith by sliding the members 42 longitudinally with respect to the brackets 40, and thereafter the two flanges 41 and 43 are welded together at their outer end edges as indicated at 49. By reason of this construction the assembly may be taken apart for repair or replacement of various parts by cutting the weld indicated at 49. The long flanges 41 and 43 provide sufficient material so that they may be again welded together upon reassembly, this operation being permissible a number of times.

The spring end is maintained on the pin by a spring shackle comprising a separable housing 50 having lower, lateral flanges matching lateral flanges on the mounting bracket 40 for reception of bolt fastening means indicated at 51. Preferably a thick, resilient pad 52 is interposed between the top of the housing 50 and the upper surface of the third spring leaf 11. By reason of this construction the wheel mounting members are maintained in parallelism, and at exact distances from the trunnion 1 through engagement of the portion 45 with the opening 46, while the two wheel mounting members 7 may shift angularly in the vertical sense with respect to each other and may rotate to a limited extent by reason of the spherical shape of the pin 45 and the convex surface 44, without in any way straining the construction. The leaf springs as seen in Figs. 1 and 13, when subjected to light loading, are inclined downwardly at their ends, and for this reason the axis of the pivot pin 45 is inclined outwardly with respect to the vertical plane through the axis of the wheel mounting member. However, the spherical engaging surfaces permit the spring to flatten out, as shown in dash lines in Fig. 13, and the wheel mounting members are permitted to shift angularly, without straining the spring leaves or any portion of the construction. The spherical pin 45 is preferably of large diameter for strength, with the result that the lower leaf spring 9 is considerably weakened at this point, and the extension portion 47 is provided as a safety check to prevent the wheel mounting member 7 from tearing loose from the spring if the leaf 9 should fail at this point. The spring end shackle construction is more completely illustrated, described and claimed in my copending application, Serial No. 336,780, executed concurrently herewith and filed on February 13, 1953, and it is to be appreciated that equivalent means may be substituted therefor within the purview of the present invention.

In accordance with the present invention each saddle is connected to a separate one of the wheel mounting members by a link and associated means as follows: A crank is fixed to each member 7 in depending relation thereto and in prolongation of the axis of the spherical pin 45, the crank comprising an upper portion 53 shaped to fit the lower surface of the member 7 and having its edges welded thereto, and a laterally spaced pair of arms 54 adapted to mount a first transverse pivot including a pivot bolt 55. For this purpose each arm 54 is provided with a transverse opening to receive a portion of the wedge bolt, and the outer end of the arm is split and provided with a longitudinal opening for reception of a longitudinally extending clamping bolt 56 whereby the split end of the crank arm may be frictionally clamped about the bolt. The intermediate portion of the bolt 55 is tapered and its inner end is threaded, as seen in Fig. 7, for reception of a nut 57. The tapered portion of the bolt fits into a longitudinally split expansion sleeve 58, the ends of which bear against the spaced arms of the crank, and the outer surface of which is cylindrical and provided with longitudinally extending grooves indicated at 59 whereby a firm grip is maintained on a surrounding resilient sleeve 60. The outer surface of the resilient sleeve 60 is embraced by the strap portion 61 of a knuckle member including a longitudinally extending socket forming portion 62. The inner surface of the strap portion 61 is provided with longitudinal grooves 63 which cause firm engagement of the strap with the resilient sleeve 60 when the expansion sleeve 58 is expanded. The same construction is provided in relatively reversed relation between a pair of horizontally extending pivot mounting arms 64 integral with the adjacent portion of one of the pedestal portions 22.

The socket forming portions 62 receive the opposite ends of a link tube 65 which is slidably positioned therein during initial assembly. Each of the socket forming portions 62 is provided with a pair of slots 66 therethrough adapted to be filled with molten welding rod material after final alignment has been achieved whereby exactly to fix the length of each link so as to maintain the angular inclination of the crank arms 54. As seen most clearly in Fig. 3, there are only two such connecting links, one under a forwardly extending end of one leaf spring and the other under a rearwardly extending end of the other leaf spring. The pivot bolt 55 mounted in the crank arms 54 constitutes a first transverse pivot which is maintained at a distance below its wheel mounting member, and the pivot bolt 55 mounted in the arms 64 constitutes a second transverse pivot maintained at a distance above the trunnion 1 in longitudinal alignment with the first pivot, so that each link extends longitudinally and diagonally upward toward the center of its associated leaf spring. Only one such link is provided at each side of the trunnion so as to permit relative vertical movement of the wheel mounting members whereby the wheels may accommodate themselves to uneven ground.

In Fig. 11 the invention is schematically illustrated in order fully to explain the operation thereof. In this figure the vehicle is represented by the numeral 68, and is traveling in the direction of the arrow thereon whereby the wheels indicated at 69 and 70 are rotating in the direction of the arrows thereon. The trunnion 1 is illustrated in its proper relation to the vehicle body and the spring 8 is shown as mounted thereon by saddle means 71, the trunnion being connected to the vehicle body by means indicated at 72. It is to be appreciated that when the brakes are applied in an assembly of this type the momentum of the load tends to tip the wheel assembly forwardly about the point of engagement of the wheel 69 with the ground, indicated at 73, the tipping force being applied at the centerline of the trunnion 1, which is at the apex of an equilateral triangle having its base extending between the point 73 and the point 74 where the wheel 70 contacts the ground. If the trunnion 1 were located above the spring, as indicated in dash line at 75, the load triangle would be quite high and the force required to tip the assembly forwardly and raise the rear wheel 70 from the ground would be low. Such a construction would be quite dangerous, hence most trunnion assemblies have the trunnion mounted at the point indicated in dash outline at 76 to create a more stable structure which is more difficult to tip over. In my construction I have purposely lowered the trunnion 1 to the point indicated, whereby the greatest force is required to tip the wheel assembly about the point 73.

The construction is again schematically illustrated as described above, in Fig. 12, with the addition of the crank arms 54, the links 65, and the link attaching arms 64. When the brakes are applied the wheel mounting members 7 tend to rotate in the direction of the arrows adjacent thereto, thereby pushing upwardly on the link 65 forwardly of the trunnion 1 and pulling downwardly on the link 65 rearwardly of the trunnion 1, as indicated by the arrows adjacent thereto. The saddle 71 is rigidly secured to the central portion of the spring and cannot tip with respect thereto, but if we assume that this member is hinged at a central point indicated at 77 and were free to move to the extent indicated by the angularly disposed dash lines adjacent the point 77, then the brake application would certainly tip this saddle member 71. Therefore, it can be understood that forces developed by applying the brakes are transmitted through the saddle member into the springs, as indicated by the directional arrows 78 and 79. Force is applied upwardly on the forward portion of the spring and downwardly on the rearward portion of the spring, thus increasing the load on the rear wheel mounting member and at the same time relieving the front wheel mounting member of some of its load, and thereby offsetting the normal, undesirable load transfer onto the front wheels. The application of these forces is permissible since the leaf spring 8 is flexible and, instead of the saddle member 71 angularly rocking about the hinge point 77 with respect to the spring 8, the assembly of the saddle member 71 and the central portion of the spring 8 tends to rock as a unit, thereby flexing the spring in the manner indicated by the directional arrows 78 and 79. If, on the other hand, the torque arms were located according to prior art practices as indicated in broken line at 80 and 81 so as to form a parallelogram with the ends of the spring, none of this load transfer could be effected.

In Fig. 13 I have illustrated the practicability of the present device by showing the parts in full line in the positions which they occupy under normal conditions and under a light load, and in dash line in the positions which they occupy under normal conditions and under a heavier load with the spring flattened out. It will be seen that the lowering of the trunnion causes a corresponding lowering of the upper pivot means attached thereto and an angular displacement of the link means, with angular displacement of the crank arms of the lower pivot means in direct proportion. The wheel mounting member 7 is therefore rotated in proportion to the downward displacement of the spring center, which causes the spring seating surface 44 to be displaced so as to approach a horizontal condition and permit continued flexibility of the universal joint connection. This figure illustrates the fact that under any condition of loading the connecting link does not place a strain upon the spring and its universal pivot connection and is always ready and able to achieve its function of transferring load from the front wheels to the rear wheels to keep the rear wheels firmly on the ground when the brakes are applied.

Having illustrated and described a preferred embodiment of the present invention, it should be apparent to those skilled in the art that the same permits of modification in arrangement and detail. I claim as my invention all such modifications as come within the true spirit and scope of the appended claims.

1. A tandem axle assembly for a vehicle comprising an elongated trunnion mounted upon and extending transversely of the vehicle, a pair of elongated, wheel mounting members extending parallel to said trunnion at equal distances before and after said trunnion, a laterally spaced pair of leaf springs extending longitudinally of the vehicle, a pair of spring mounting saddles journaled on and extending above said trunnion and each supporting one of said leaf springs thereabove, means rigidly securing each of said saddles to its associated leaf spring with the ends of said leaf springs respectively overlying said wheel mounting members, a plurality of universal joint means each securing an end of a spring to the upper surface of the adjacent wheel mounting member, a pair of downwardly extending cranks each fixed to a separate one of said wheel mounting members directly beneath one of said universal joint means, a pair of first transverse pivot means each rigidly mounted on a separate one of said cranks, a pair of second transverse pivot means each rigidly mounted on a separate one of said saddles, and a pair of longitudinally extending, rigid links each pivotally connected at one end to a separate one of said first transverse pivot means, then extending diagonally upward and pivotally connected at its opposite end to a separate one of said second transverse pivot means.

2. A tandem axle assembly for a vehicle comprising an elongated trunnion mounted upon and extending transversely of the vehicle, a pair of elongated, wheel mounting members extending parallel to said trunnion at equal distances before and after said trunnion, a laterally spaced pair of leaf springs extending longitudinally of the vehicle, a pair of spring mounting saddles rotatably mounted upon said trunnion and each supporting one of said leaf springs thereabove, means rigidly securing each of said saddles to its associated leaf spring with the ends of said leaf springs respectively overlying said members, a plurality of spring end shackle assemblies each securing an end of a spring to the upper surface of the adjacent wheel mounting member and including an upright ball pin, a pair of downwardly extending cranks each fixed to a separate one of said wheel mounting members in downward prolongation of the axis of one of said ball pins, a pair of first transverse pivots each secured to a separate one of said cranks below said wheel mounting members, a pair of second transverse pivots each secured to a separate one of said saddles above said trunnion, and a pair of longitudinally extending links each pivotally connected at one end to a separate one of said first transverse pivots and at its opposite end to a separate one of said second transverse pivots, each of said links comprising a pair of telescoped members rigidly welded to each other.

3. A tandem axle assembly for a vehicle comprising an elongated trunnion mounted upon and extending transversely of the vehicle, a pair of elongated, wheel mounting members extending parallel to said trunnion at equal distances before and after said trunnion, a laterally spaced pair of leaf springs extending longitudinally of the vehicle, a pair of spring mounting saddles rotatably mounted upon said trunnion and each supporting one of said leaf springs thereabove, means rigidly securing each of said saddles to the central portion of its associated leaf spring with the ends of said leaf springs respectively overlying said wheel mounting members, a plurality of ball pins each mounted on one of said wheel mounting members adjacent a separate spring end, said spring ends each having an opening snugly receiving the adjacent ball pin, a plurality of housing means secured to said wheel mounting members and each enclosing a spring end to secure said spring ends to said ball pins, a pair of downwardly extending cranks each fixed to a separate one of said wheel mounting members below said ball pins, a pair of first transverse pivots each secured to a separate one of said cranks, a pair of second transverse pivots each secured to a separate one of said saddles above said trunnion, and a pair of longitudinally extending links each pivotally connected at one end to a separate one of said first transverse pivots and at its opposite end to a separate one of said second transverse pivots, one of said links extending longitudinally beneath one of said springs forwardly of said trunnion and the other of said links extending longitudinally beneath the other of said springs rearwardly of said trunnion.

4. A tandem axle assembly for a vehicle comprising an elongated trunnion mounted upon and extending transversely of the vehicle, a pair of elongated, wheel mounting members extending parallel to said trunnion at equal distances before and after said trunnion, a laterally spaced pair of leaf springs extending longitudinally of the vehicle adjacent the opposite sides thereof, a pair of spring mounting saddles rotatably mounted upon said trunnion and each supporting one of said leaf springs at a distance above said trunnion with their ends respectively overlying said wheel mounting members, a plurality of spherically shaped members mounted upon and extending above said wheel mounting members, each of said spherically shaped members being adjacent an end of a spring and each of said spring ends having an opening into which the adjacent spherically shaped member extends, means associated with each of said spherically shaped members providing therewith a universal joint connection for securing said spring ends to said wheel mounting members, a pair of resilient sleeves each interposed between said trunnion and a separate one of said saddles, said sleeves resiliently resisting rotation of said saddles about said trunnion, a pair of cranks each fixed to and depending from a separate one of said elongated members, a pair of longitudinally extending links each pivotally connected to one of said cranks and extending diagonally upward therefrom toward and above said trunnion, and a pair of pivots each mounted on one of said saddles at an elevation above said trunnion and pivotally connecting the inner end of a separate link to one of said saddles.

References Cited in the file of this patent
UNITED STATES PATENTS

| | | |
|---|---|---|
| 1,868,173 | Low | July 19, 1932 |
| 2,347,409 | Harbers | Apr. 25, 1944 |
| 2,390,912 | Ayers | Dec. 11, 1945 |
| 2,520,778 | Page | Aug. 29, 1950 |